UNITED STATES PATENT OFFICE.

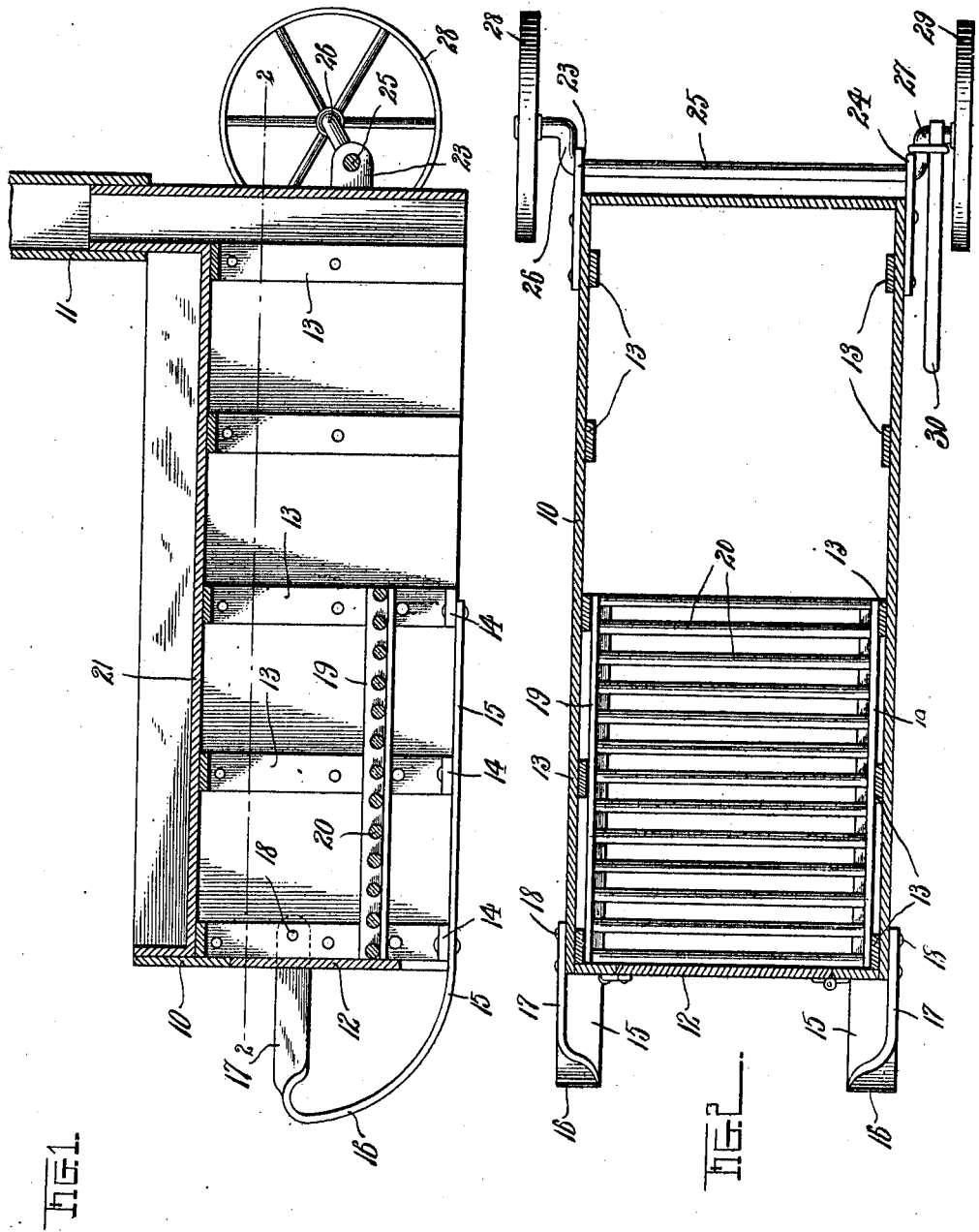

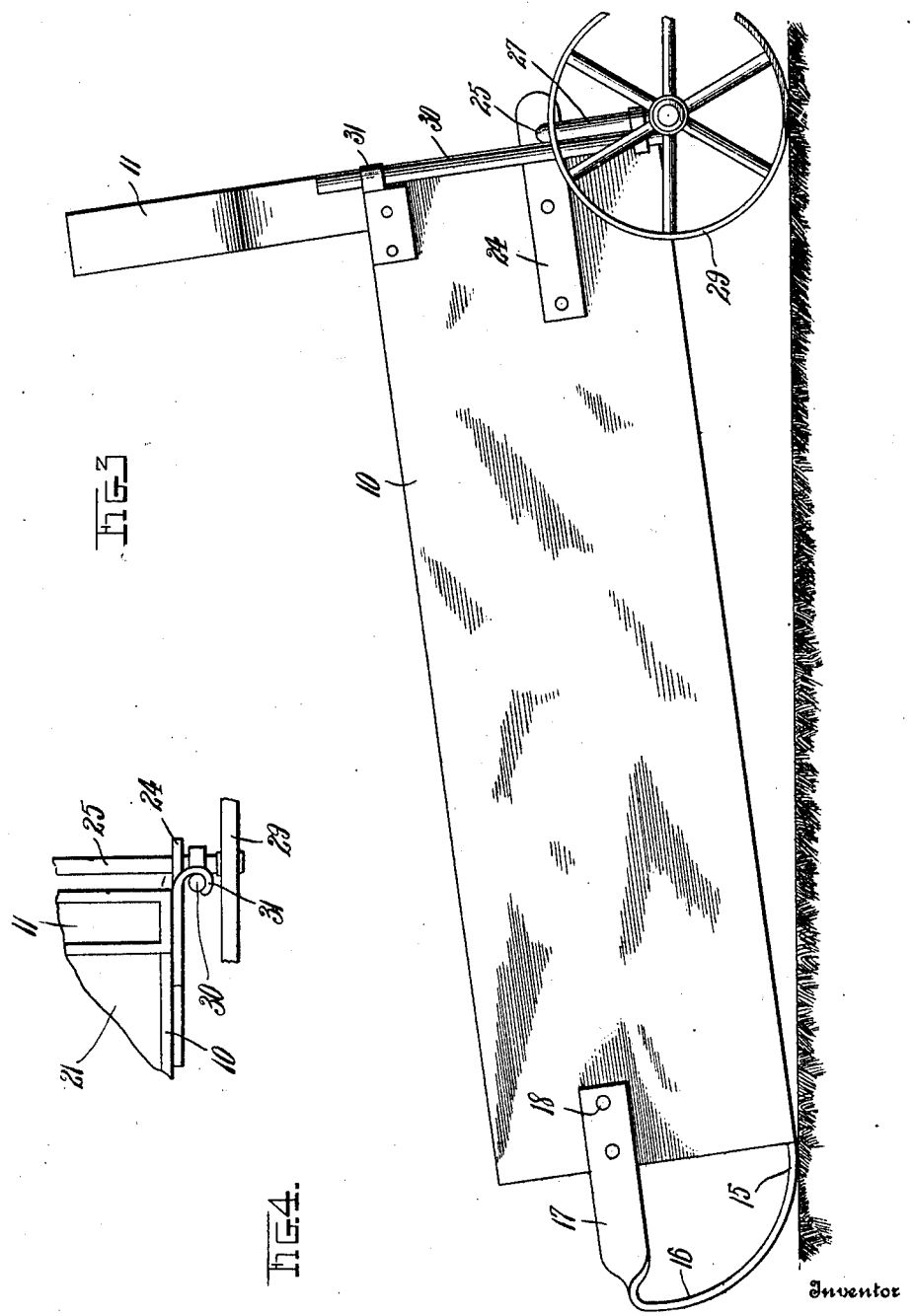

CHARLES T. CAMPBELL, OF WOODVILLE, KENTUCKY.

PLANT-BED BURNER.

988,309.     Specification of Letters Patent.     Patented Apr. 4, 1911.

Application filed June 4, 1908. Serial No. 436,738.

*To all whom it may concern:*

Be it known that I, CHARLES T. CAMPBELL, a citizen of the United States, residing at Woodville, in the county of McCracken, State of Kentucky, have invented certain new and useful Improvements in Plant-Bed Burners; and I do hereby declare the following to be a full, clear, and exact description of the invention, such as will enable others skilled in the art to which it appertains to make and use the same.

This invention relates to apparatus for burning over land prior to seeding, for the purpose of destroying the germs and roots of all plant life in the soil and thus destroying noxious weeds and other undesirable plants, and has for one of its objects to improve and simplify the construction and increase the efficiency and utility of devices of this character.

Another object of the invention is to provide a simply constructed device having adjustable bearing wheels at one end and runners at the other end, whereby the device may be readily transported or moved from place to place over the ground as required.

Another object of the invention is to provide an apparatus of this class wherein provision is made for applying the flames and heat directly to the soil, applying the heat indirectly to the soil beneath the device, or applying the heat indirectly or by radiation to a mass of loose earth simultaneously, and thus utilizing the heat more completely.

With these and other objects in view the invention consists in certain novel features of construction as hereafter shown and described and then specifically pointed out in the claim, and in the drawings illsutrating the preferred embodiment of the invention, Figure 1 is a longitudinal sectional elevation, with the apparatus in operative position. Fig. 2 is a plan view in section on the line 2—2 of Fig. 1. Fig. 3 is a side elevation with the body elevated at one end ready for transportation. Fig. 4 is a detail view illustrating the manner of constructing the carrier wheel holding device.

The improved apparatus comprises a shell 10 of sheet metal of any required size, but will generally be about nine feet long and three feet wide, but these proportions may be varied as required, and the invention is not therefore to be limited to any particular size or to any particular proportion of the parts.

The shell 10 is formed with a smoke stack 11 at one end and a fuel door 12 at the other end. The top member 21 of the shell is spaced below the top for a short distance, to provide a shallow receptacle in which to deposit loose earth in which the plant life is to be subjected to indirect heat, as hereafter explained. The side walls of the shell and the depressed top 21 are braced or supported at intervals by arching bars 13, and several of these bars, in the illustration three, are directed inwardly at their lower ends at 14 to form supports for runner plates 15 which are riveted thereto, as shown, the runner plates projecting beyond one end of the shell and curving upwardly at 16 and thence extending inwardly at 17 and secured at 18 to the sides of the shell. The curved portions 16 of the runners enable the device to be drawn over the ground in one direction without catching upon protruding objects, while the horizontal portions 17 form convenient means to assist in handling the apparatus. Connected across several of the bars 13 and spaced from the bottom of the shell are angle bars 19 providing supports for a grate 20, the grate coming next to the fuel door 12, the latter stopping short of the lower edge of the shell to provide for suitable draft beneath the grate. Attached to the side walls of the shell at the smoke stack end are brackets 23—24, and journaled through these brackets is an axle 25 with offsets 26—27 outside the brackets and with wheels 28—29 journaled upon the outer ends of the offsets. The axle is so disposed that when turned to bring the offsets in downward position, the wheels will engage the ground and elevate the smoke stack end of the apparatus, so that it can be readily transported, or moved from place to place over the ground.

A hand lever 30 is rigidly connected to the offset 27 to operate the axle, and the shell 10 is provided with a keeper 31 to receive the lever when holding the wheels in their depressed position, the lever yielding laterally to permit it to be engaged with the keeper and which will also yield to lateral pressure in the opposite direction when it is desired to elevate the wheels and restore the shell to its operative position.

When the device is to be used it is disposed over the ground to be treated and lowered down with the lower edges upon the ground, and preferably "banked" by packing soil against them, to prevent the entrance of air except through the draft aperture beneath the door 12. A fire is then built upon the grate 20 and the products of the combustion pass the entire length of the shell and escape through the stack 11 and thus come in contact with the ground covered by the shell and produce the required "burning" effects, and destroy the obnoxious plant life. The burning is continued as long as required, and then the shell elevated at one end upon its wheels by operating the hand lever as above described and the apparatus moved to a new location, and so on over the whole field.

The shallow pan in the top of the shell provides a convenient means for containing loose earth which will be shoveled up from the plant bed and subjected to the indirect heat from the fire, and thus provides means for destroying the plant life in the loose earth at the same time that the natural earth beneath the shell is being treated. The heat is thus more thoroughly utilized and the economy of fuel materially increased. After the earth in the pan has been treated sufficiently it is scattered over the earth which has already been burned, and a fresh supply of unburned earth deposited in the pan, and so on continuously.

Devices of this character are employed upon the soil prior to seeding, and are usually applied to soil upon which tobacco and similar crops are to be planted, but may be employed to prepare the soil for various kinds of seeds, as will be obvious.

The smokestack may be made in sections as shown, so that the removable sections may be detached when the device is to be shipped, or transported for relatively long distances.

The shell may be of any required size, and it is not desired therefore to limit the dimensions in any manner, and other minor changes may be made within the scope of the appended claim without departing from the principle of the invention or sacrificing any of its advantages.

What is claimed, is:—

A plant bed burner comprising an open bottom furnace shell and a furnace therein in combination with means for elevating and supporting one end of said shell for transportation, and other means for slightly elevating and supporting the remaining end of said shell when the first end is elevated whereby no portion of the shell will contact with the ground during transportation, said other means comprising a pair of runners curved outwardly and upwardly from said end, the curvature of the runners being such that the contact of the runners with the ground will be at points spaced from that end of the shell to which the runners are attached when the remaining end is elevated.

In testimony whereof, I affix my signature, in presence of two witnesses.

CHARLES T. CAMPBELL.

Witnesses:
V. J. HARRIS,
G. H. OBERLY.

---

Copies of this patent may be obtained for five cents each, by addressing the "Commissioner of Patents, Washington, D. C."